United States Patent
Widulle et al.

(10) Patent No.: US 6,213,533 B1
(45) Date of Patent: Apr. 10, 2001

(54) DEVICE HAVING A POP-OUT PART FOR INSTALLATION IN A MOTOR VEHICLE

(75) Inventors: Ruediger Widulle, Munich; Michael Schmidt, Wildberg; Bernd Plocher, Rottenburg-Seebronn, all of (DE)

(73) Assignee: Fischerwerke Artur Fischer GmbH & Co. KG, Waldachtal (DE)

( * ) Notice: Subject to any disclaimer, the term of this patent is extended or adjusted under 35 U.S.C. 154(b) by 0 days.

(21) Appl. No.: 09/368,026

(22) Filed: Aug. 3, 1999

(30) Foreign Application Priority Data

Aug. 5, 1998 (DE) .............................. 198 35 364

(51) Int. Cl.⁷ .................................................. B60R 13/01
(52) U.S. Cl. ................... 296/37.12; 296/37.9; 296/37.8; 312/333; 224/282
(58) Field of Search ................................ 296/37.1, 37.8, 296/37.9, 37.12, 37.13; 312/333, 215, 222; 292/DIG. 22, DIG. 65; 224/282

(56) References Cited

U.S. PATENT DOCUMENTS

| | | | |
|---|---|---|---|
| 2,798,632 | * | 7/1957 | Holly et al. .......................... 296/37.9 |
| 4,006,951 | * | 2/1977 | Geer et al. ........................... 312/333 |
| 4,239,277 | * | 12/1980 | Oda ..................................... 296/37.12 |
| 4,422,522 | * | 12/1983 | Slavin et al. ................... 292/DIG. 22 |
| 4,494,806 | * | 1/1985 | Williams et al. ..................... 312/333 |
| 4,596,416 | * | 6/1986 | Müller ............................... 296/37.12 |
| 4,743,060 | * | 5/1988 | Hishida ................................ 224/282 |
| 4,988,134 | * | 1/1991 | Vidvans et al. ............... 292/DIG. 22 |
| 5,002,074 | * | 3/1991 | Kimisawa ........................... 296/37.9 |
| 5,052,728 | * | 10/1991 | Fukumoto ..................... 292/DIG. 22 |
| 5,255,983 | * | 10/1993 | Parvin ................................. 312/333 |
| 5,263,346 | * | 11/1993 | Sato et al. ......................... 296/37.12 |
| 5,308,130 | * | 5/1994 | Lee ............................... 292/DIG. 22 |
| 5,385,378 | * | 1/1995 | Hakamada et al. ............... 296/37.12 |
| 5,386,636 | * | 2/1995 | Asano ............................... 296/37.12 |
| 5,388,901 | * | 2/1995 | Asano ............................... 296/37.12 |
| 5,507,423 | * | 4/1996 | Fischer et al. ..................... 296/37.8 |
| 5,522,638 | * | 6/1996 | Falcoff et al. ..................... 296/37.8 |
| 5,558,385 | * | 9/1996 | Gross et al. ..................... 296/37.12 |
| 5,669,642 | * | 9/1997 | Kang ............................. 292/DIG. 22 |
| 5,775,761 | * | 7/1998 | Asami et al. ..................... 296/37.8 |
| 5,800,005 | * | 9/1998 | Arold et al. ..................... 296/37.12 |
| 5,887,930 | * | 3/1999 | Klein ................................. 296/37.9 |
| 6,024,395 | * | 2/2000 | Kang ................................. 296/37.1 |
| 6,062,623 | * | 5/2000 | Lemmen ............................. 296/37.8 |

\* cited by examiner

*Primary Examiner*—Joseph D. Pape
*Assistant Examiner*—Kiran Patel
(74) *Attorney, Agent, or Firm*—Michael J. Striker

(57) ABSTRACT

A device for installation in a motor vehicle has a pop-out part which is movably guided from an initial position into a usage position and vice versa, a guide for guiding the pop-out part for movement from the initial position into the usage position and vice versa, and a safety locking device having a movable latch arranged to be brought by an acceleration into an engagement with the pop-out part so as to lock the pop-out part in the initial position.

7 Claims, 5 Drawing Sheets

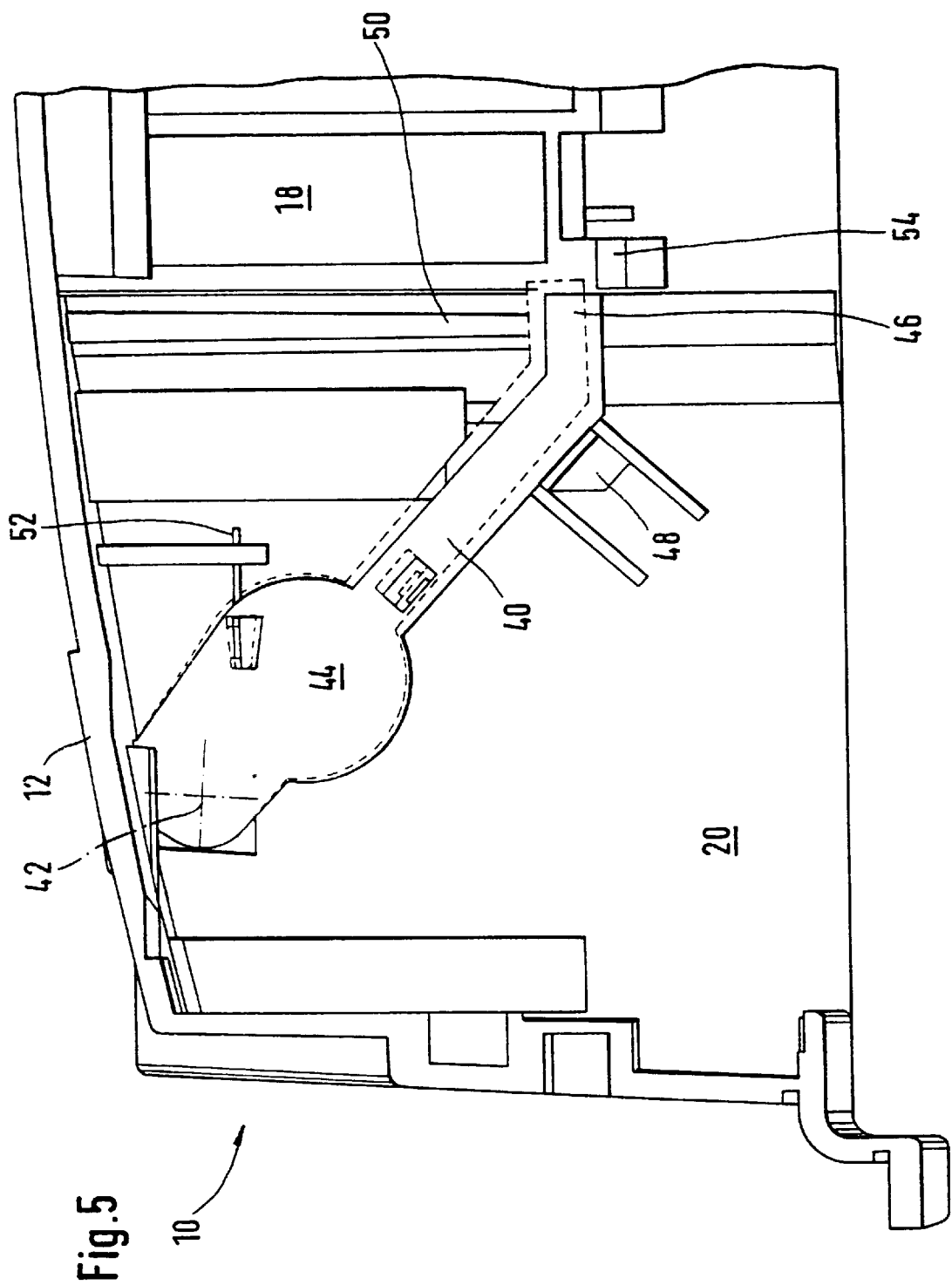

DEVICE HAVING A POP-OUT PART FOR INSTALLATION IN A MOTOR VEHICLE

BACKGROUND OF THE INVENTION

The invention relates to a device for installation in a motor vehicle, the device having a pop-out part.

A pop-out part of that kind can be, for example, a storage compartment that is movable by displacement in the manner of a drawer fro man initial position into a position of use. In the initial position, the pop-out part closes substantially flush with, for example, the dashboard of the motor vehicle, and in the position of use the pop-out part projects into the passenger space. A pivoting or other kind of guide means, for example, can also be provided to enable the pop-out part to be moved from the initial position into the position of use. The pop-out part can be, for example, a holder for a drinks container, such as a can of drink, a cup or similar.

If the motor vehicle is involved in an accident, accelerations can act on the pop-out part and move it automatically and undesirably from the initial position into the usage position. Since the pop-out part projects into the passenger space in the usage position, there is an increased risk of injury.

SUMMARY OF THE INVENTION

Accordingly, it is an object of the present invention to provide a device having a pop-out part for installation in a motor vehicle, which avoids the disadvantages of the prior art.

More particularly, it is an object of present invention to provide securing a pop-out part in a motor vehicle against automatic opening in the event of an accident, opening meaning transport of the pop-out part from the initial position into the usage position.

The device according to the invention has a safety lock with a latch. By virtue of its inertia, in the event of a rear-end collision, impact of the motor vehicle against an obstacle and the like, the latch comes into engagement with the pop-out part located in the initial position and lock this. As a result of an acceleration, especially a negative acceleration (deceleration) of the motor vehicle, the latch therefore engages to lock the pop-out part in the initial position. The invention has the advantage that the pop-out part does not open in the event of an accident, that is, does not move from the initial position into the usage position, hence during the risk of injury.

In a practical example of the invention, the latch of the safety lock is mounted in the motor vehicle so as to pivot through a limited pivoting angle about a pivot axis. The contact point of the latch, with which, in the event of an accident, the latch comes into engagement with the pop-out part located in the initial position, is spaced from the pivot axis. The centre of mass of the latch is located between the pivot axis and the contact point of the latch. In the event of an accident, because of the part and the latch move relative to the motor vehicle. It can be assumed that the pop-out part and the centre of mass of the latch move at least approximately the same speed relative to the motor vehicle. Since the contact point of the latch is spaced further from the axis thereof than the centre of mass of the latch, the contact point moves relative to the motor vehicle at a greater speed than the pop-out part. Because of this greater speed of the contact point of the latch compared with the pop-out part, the latch comes quickly into engagement with the pop-out part during an accident and locks it; the pop-out part hardly moves from its initial position at all.

The invention is provided in particular for a drawer or similar storage tray, in which articles can be placed. It is especially important here that the drawer remains in its closed initial position in the event of an accident, so that stored articles cannot fly out and injure passengers.

In a preferred construction, the latch has an increased mass in the region of its centre of mass. The increased mass can be formed, for example, by an enlarged cross-section of the latch in the region of the plastics material forming the latch. The position of the centre of mass of the latch can be fixed by choosing the location on the latch at which the increased mass is arranged.

The device according to the invention is provided in particular for a pop-out part that is locked in its initial position by a push-push locking device known per se and, after being unlocked, is moved into the usage position by an opening spring element. The push-push device, also called a cardioid mechanism, is unlocked by a pressure on a front side of the pop-out part, which presses the pop-out part a short way into the dashboard or similar structure of the motor vehicle. The device according to the invention prevents the push-push locking device from coming unlocked automatically because of accelerations occurring in the event of an accident, in that it stops the pop-out part before the push-push locking device unlocks. The device according to the invention is also able to block the push-push locking device when the motor vehicle is involved in an accident, so that the push-push locking device cannot unlock itself. A further point is that the device according to the invention locks the pop-out part in its initial position when the motor vehicle is involved in an accident, regardless of whether the push-push locking device is locked or unlocked.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 is a plan view of the base of the housing of the device from FIG. 1.

DESCRIPTION OF PREFERRED EMBODIMENTS

Figure 1:
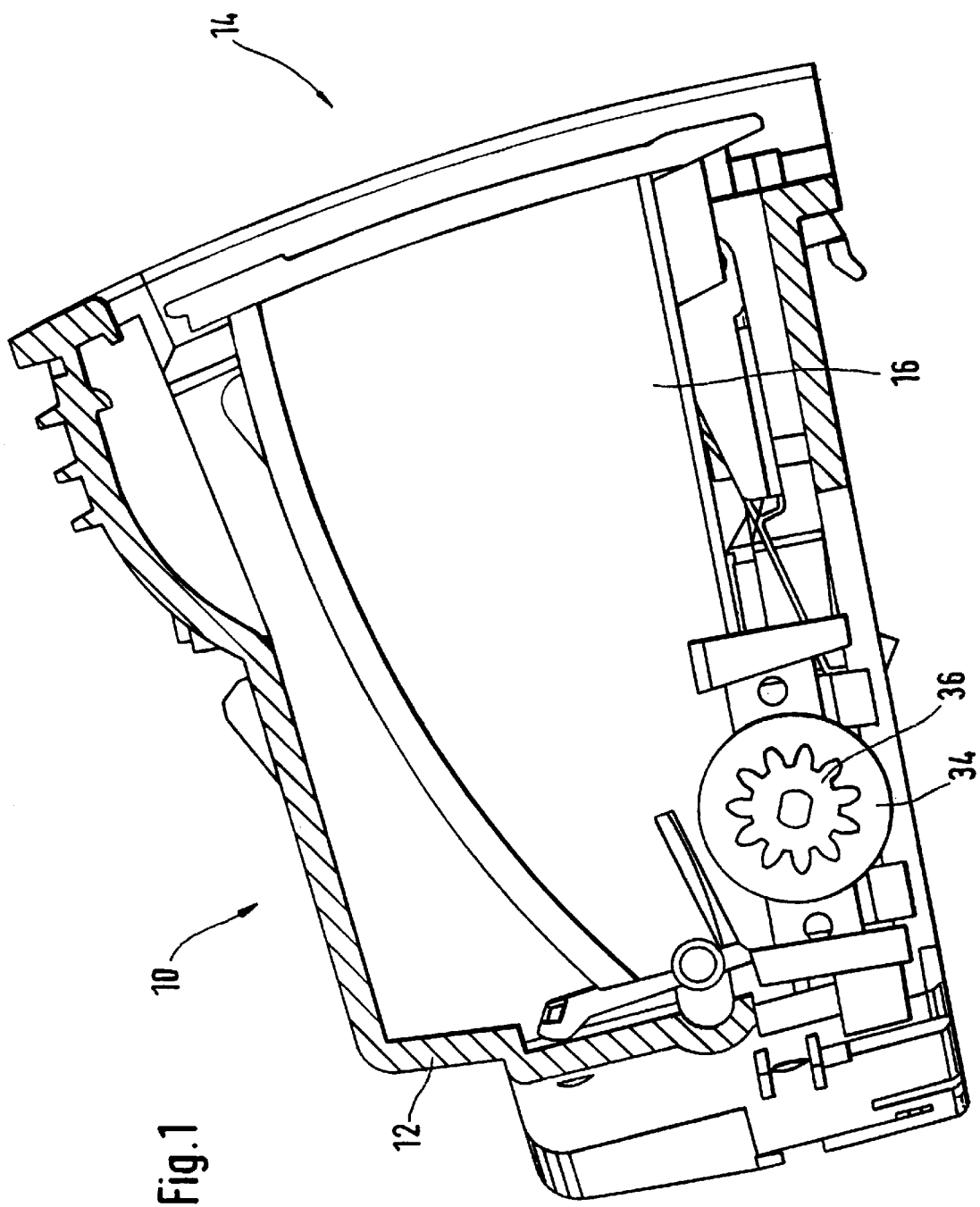
FIG. 1 shows in side view a device according to the invention in an initial position.
Figure 2:
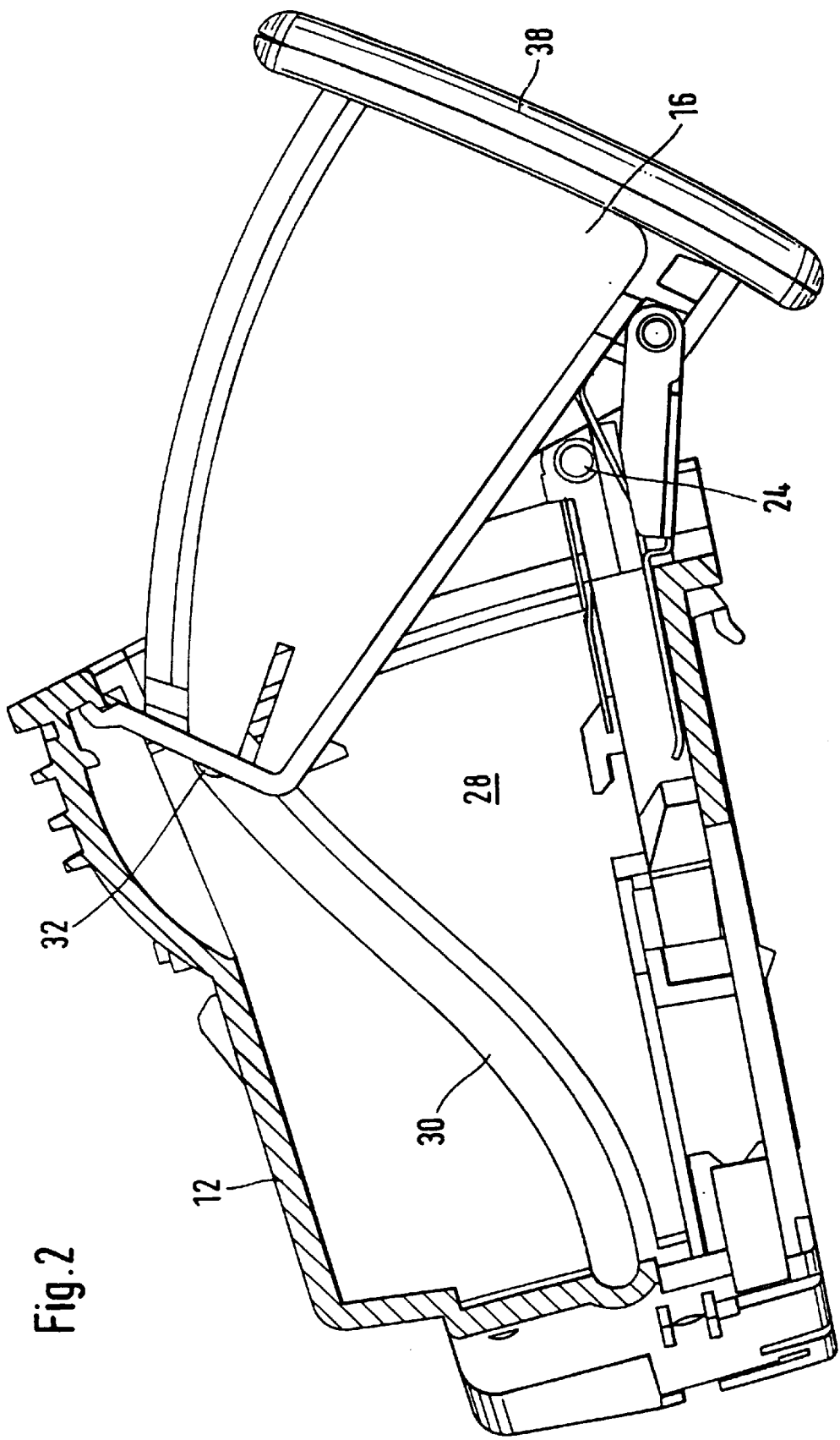
FIG. 2 shows the device from FIG. 1 in a usage position.
Figure 3:
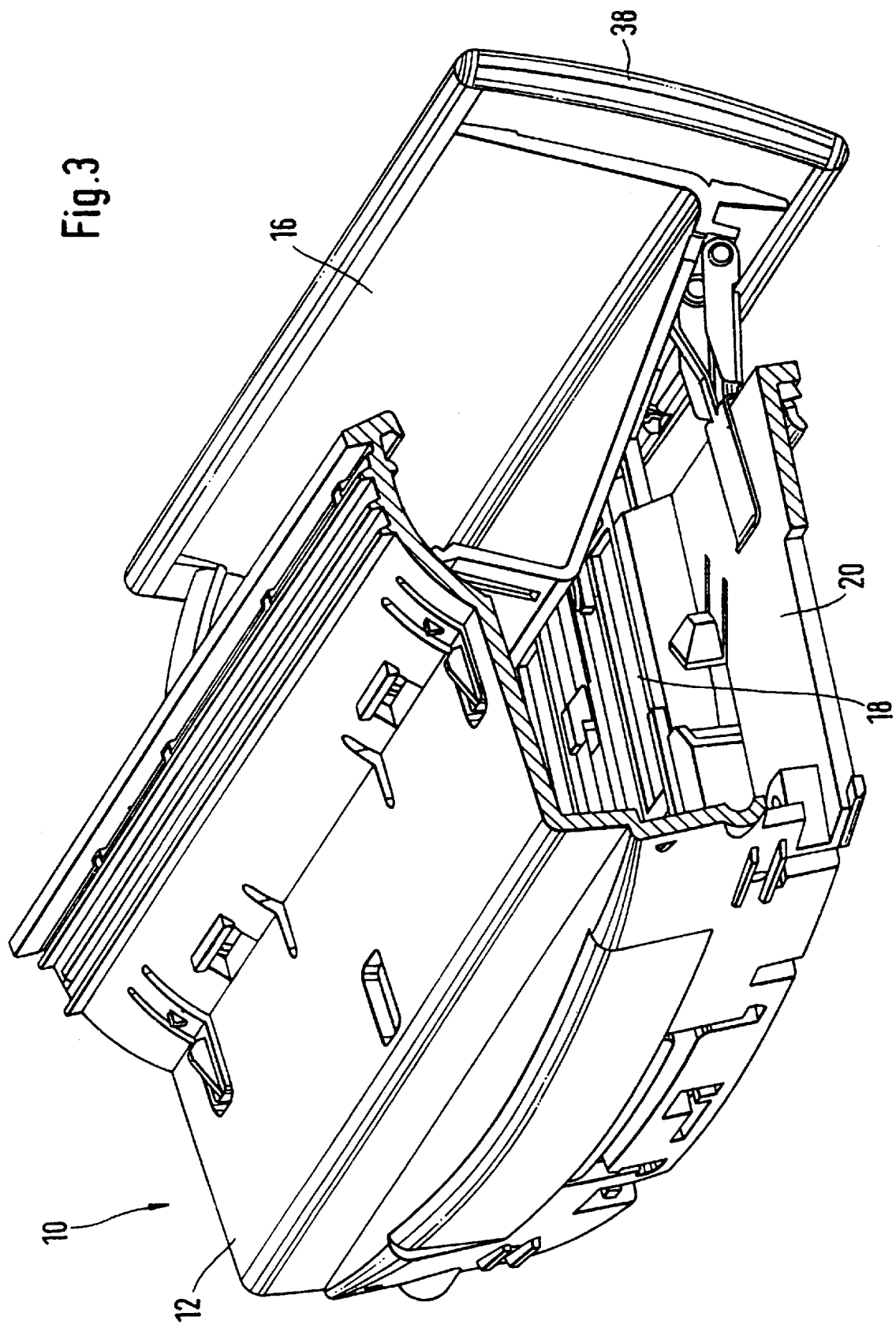
FIG. 3 is a perspective view of the device from FIG. 1 in the usage position.

The device 10 according to the invention illustrated in FIGS. 1 to 3 comprises a box-shaped housing 12 with an open front 14. The device 10 is provided for fitting into, for example, the dashboard, not illustrated, of a motor vehicle. The housing 12 is installed so that it is recessed and has its front 14 flush with the dashboard. A storage tray, referred to hereinafter as drawer 16, is received in the housing 12.

Figure 4:
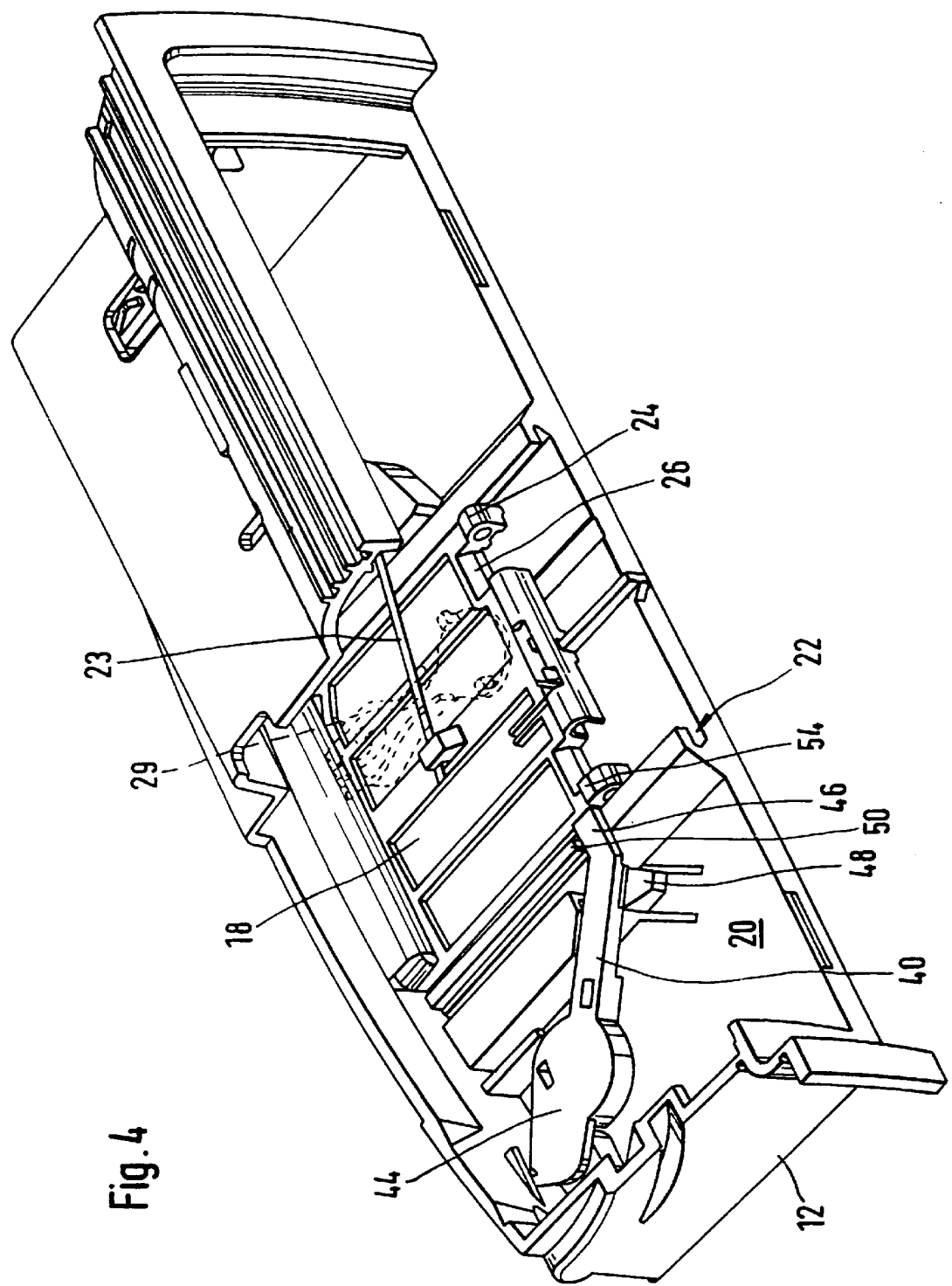
FIG. 4 is a perspective view of a housing of the device from FIG. 1.

The device 10 has a guide means by which the drawer 16 is displaceable from an initial position illustrated in FIG. 1, in which it is inserted in the housing 12, into a usage position illustrated in FIGS. 2 and 3, in which position the drawer 16 projects from the housing 12. The guide means for the drawer 16 comprises a plate-like slider member 18 on the base 20 of the housing 12 (FIG. 4). The slider member 18 engages laterally in channels 22 of the housing base 20 and is accordingly guided slidingly on the housing base 20. By means of a pin articulation 24 (FIG. 2), the drawer 16 is pivotally mounted at a front edge 26 of the slider member 18. On its lateral walls 28, the housing 12 has cranked guideways 30, in which guide pins 32 projecting laterally from the drawer 16 at a rear side thereof engage. The cranked guideway means comprising cranked guideways 30 and guide pins 32 causes a front end of the drawer 16 to pivot downwards as it is displaced into the usage position, so that in the usage position the drawer 16 assumes a downwardly inclined position in which its interior space is readily accessible.

Displacement of the drawer 16 into the usage position is effected by an opening spring element. In this exemplary embodiment illustrated, the opening spring element is leg spring 23 that is mounted on the base 20 of the housing 12 and presses the drawer 16 at the slider member 18 thereof into the usage position. Closure of the drawer, that is, displacement into the housing 12 into the initial position, is effected against the spring force of the leg spring 23. The displacement movement of the is mounted laterally on the drawer 16 in the rear region thereof. A gearwheel 36 of the rotary damping element 34 meshes with a toothed rack, not illustrated in the drawing, on an inner side of a lateral wall 28 of the housing 12.

In the initial position, the drawer 16 is locked by means of push-push locking device (cardioid mechanism) 29 known per se, which is arranged on the underside of the slider member 18. The push-push locking device 29 is unlocked by pressure against a front panel 38 of the drawer 16, that is, by pressing the drawer 16 a short distance beyond the initial position into the housing 12. After unlocking the push-push locking device 29, the leg spring 23 opens the drawer 16, that is to say, the leg spring 23 displaces the drawer 16 into the usage position.

The device 10 has a safety locking device which locks the drawer 16 in the initial position if the motor vehicle is involved in an accident.

The safety locking device is illustrated in FIGS. 4 and 5. The drawer 16 has not been drawn in these two Figures to facilitate clear representation of the safety locking device.

The safety locking device comprises a latch 40 in the form of an extended lever cranked at one end. The latch 40 is arranged obliquely on the housing base 20 at an angle about 45° to the direction of displacement of the drawer 16 and laterally of the slider member 18. At its end remote from the slider member 18, the latch 40 has a pivot pin, not illustrated in the drawing, which engages in a locating hole on the housing base 20. The latch 40 is accordingly mounted on the housing base 20 so as to pivot about a pivot axis 42.

A short distance from the pivot axis 42, the latch 40 has a weight 44, the plastics material forming the latch 40 being injection-moulded around the weight. The centre of mass of the latch 40 is located in the region of the weight 44. On the side of the weight 44 facing away from the pivot axis 42, the latch 40 extends as far as one side of the slider member 18. The end of the latch 40 remote from the pivot axis 42 constitutes a contact point 46. The distance of the contact point 46 from the pivot axis 42 is considerably larger than the distance of the weight 44 from the pivot axis 42. The pivoting angle of the latch 40 is restricted; it can pivot back and forth between a base stop 48 and an end stop 50, both of which are arranged on the housing base 20. A leg spring 52 presses the latch 40 against the base stop 48; this position of the latch 40 is illustrated in FIG. 4 and 5 by solid lines. The position of the latch 40 lying against the end stop 50 is indicated in FIG. 5 by broken lines. In the position lying against the base stop 48, the latch 40 is located with its contact point 46 away from the path of the slider member 18 of the drawer 16. When the latch 40 lies against the end stop 50, its contact point 46 extends into the path of a lug 54 projecting upwards from the slider member 18, so that the slider member 18 can be displaced only a short way beyond the initial position into the housing 12. The displacement path is designated to be sufficiently short to prevent the push-push locking device 29 of the drawer 16 from unlocking.

The function of the safety locking device of the device 10 according to the invention is as follows: in the event, for example, of a rear-end collision or an impact against an obstacle a high acceleration (deceleration) acts on the motor vehicle, not illustrated. This acceleration that sharply decelerates the motor vehicle causes the latch 40 and the drawer 16 with its slider member 18 to move relative to the motor vehicle and hence relative to the housing 12, that is, in FIG. 5, upwards. The latch 40 accordingly assumes the position indicated by broken lines in FIG. 5, in which it rests against the end stop 50. The contact point 46 of the latch 40 projects into the path of the lug 54 of the slider member 18 and consequently blocks the movement of the slider member 18 into the housing 12 before this movement unlocks the push-push locking mechanism 29 of the drawer 16. The drawer 16 therefore remains in its initial position inserted in the housing 12, so that articles inserted in the drawer 16 cannot fall out. In an accident, the weight 44 of the latch 40 moves approximately at the same speed as the drawer 16 with its slider member 18. The contact point 46 of the latch 40 moves at substantially higher speed than the weight 44, as its distance from the pivot axis 42 is greater. The speed at which the contact point 46 moves during an accident is thus substantially greater than the speed of the slider 18. Consequently, in the event of an accident, it is ensured that the contact point 46 projects into the path of the lug 54 of the slider member 18 before the lug 54 runs past the contact point 46 of the latch 40. Consequently, it is ensured that the contact point 46 blocks the slider member 18 so early in the event of an accident, that the push-push locking device 29 of the drawer 16 is not unlocked.

The spring force of the leg spring 52 of the latch 40 is chosen so that in normal driving and even during accelerations caused by sharp braking, it holds the latch 40 pressed against the base stop 48, so that the drawer 16 can be opened during normal driving at any time and the latch 40 makes no rattling noise. Moreover, the spring characteristic of the leg spring 52 is sufficiently weak that, by virtue of the accelerations occurring in the event of an accident, which are considerably greater than the accelerations occurring during normal driving, the contact point 46 moves more quickly relative to the housing 12 than the drawer 16 with its slider member 18.

It will be understood that each of the elements described above, or two or more together, may also find a useful application in other types of constructions differing from the types described above.

While the invention has been illustrated and described as embodied in device having a pop-out part for installation in a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

What is claimed is:

1. A device for installation in a motor vehicle, comprising a pop-out part which is movably guided from an initial position into a usage position and vice versa; guide means for guiding said pop-out part for movement from the initial position into the usage position and vice versa; and a safety locking device having a movable latch which in response to acceleration of a motor vehicle, is bringable into an engagement with said pop-out part so as to lock said pop-out part in the initial position.

2. A device as defined in claim 1, wherein said latch is pivotable by a pivot articulation through a limited pivoting angle and has a contact point which is spaced from a pivot axis of said latch and is arranged to be brought into an engagement with said pop-out part so as to lock said pop-out part in the initial position, said latch having a center of mass located between said pivot axis and said contact point.

3. A device as defined in claim 1, wherein said pop-out part is formed as a drawer.

4. A device as defined in claim 1, wherein said latch has a region of its center of mass and has an increased mass in said region.

5. A device as defined in claim 1, wherein said safety locking device is formed as a releasable push-push locking device.

6. A device as defined in claim 1, and further comprising an opening spring element arranged so that said pop-out part is moved by said opening spring element into the usage position.

7. A device as defined in claim 1, wherein said safety locking device is releasable push-push locking device by which said pop-out part is locked in the initial position; and further comprising an opening spring element arranged so that said pop-out part is moved by said opening spring element into the usage position.

* * * * *